US010374720B2

(12) United States Patent
Maierbacher et al.

(10) Patent No.: US 10,374,720 B2
(45) Date of Patent: Aug. 6, 2019

(54) LIGHT GUIDE ARRANGEMENT FOR A MOBILE COMMUNICATIONS DEVICE FOR OPTICAL DATA TRANSMISSION, MOBILE COMMUNICATIONS DEVICE AND METHOD FOR OPTICAL DATA TRANSMISSION

(71) Applicant: Osram GmbH, Munich (DE)

(72) Inventors: Gerhard Maierbacher, Munich (DE); Bernhard Siessegger, Unterschleissheim (DE); Markus Jung, Munich (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/989,234

(22) Filed: May 25, 2018

(65) Prior Publication Data

US 2018/0351649 A1 Dec. 6, 2018

(30) Foreign Application Priority Data

May 31, 2017 (DE) ........................ 10 2017 209 093

(51) Int. Cl.
*H04B 10/25* (2013.01)
*H04B 10/50* (2013.01)
*H04B 10/114* (2013.01)
*G02B 6/32* (2006.01)

(52) U.S. Cl.
CPC ............ *H04B 10/501* (2013.01); *G02B 6/32* (2013.01); *H04B 10/1143* (2013.01); *H04B 10/1149* (2013.01); *H04B 10/2504* (2013.01)

(58) Field of Classification Search
CPC .............. H04B 10/501; H04B 10/1149; H04B 10/2504; H04B 10/1143
See application file for complete search history.

(56) References Cited

U.S. PATENT DOCUMENTS 7,095,957 B1 8/2006 Britz et al.
10,185,154 B2 * 1/2019 Popovich ............ G02B 5/0252
(Continued)

FOREIGN PATENT DOCUMENTS

WO 2007123586 A2 11/2007

OTHER PUBLICATIONS

German Search Report based on application No. 102017209093.6 dated Mar. 7, 2018 (9 pages) (Reference Purpose Only).
(Continued)

*Primary Examiner* — Dzung D Tran
(74) *Attorney, Agent, or Firm* — Viering Jentschura & Partner MBB

(57) ABSTRACT

A light guide arrangement for a mobile communications device for optical data transmission by an optoelectronic interface component of the communications device is provided. The light guide arrangement includes a light guide body with a greatest extent in the principal light guiding direction, a first optical coupling member for coupling the optoelectronic interface component to the light guide body, a second optical coupling member with a first lens element that has a first optical axis transverse to the principal light guiding direction and with a first optical deflection element arranged along the first optical axis, and a third optical coupling member with a second lens element that has a second optical axis transverse to the principal light guiding direction and with a second optical deflection element arranged along the second optical axis. The second optical axis differs from the first optical axis.

20 Claims, 8 Drawing Sheets

(56) References Cited

U.S. PATENT DOCUMENTS

| | | | | |
|---|---|---|---|---|
| 2004/0076357 | A1 | 4/2004 | Maki et al. | |
| 2006/0022289 | A1 | 2/2006 | Badhei et al. | |
| 2008/0025667 | A1* | 1/2008 | Amitai ................ | G02B 6/0028 385/36 |
| 2014/0158199 | A1 | 6/2014 | Vasylyev | |
| 2015/0098090 | A1* | 4/2015 | Holzapfel .......... | G01B 9/02049 356/482 |
| 2015/0237420 | A1 | 8/2015 | Suzuki et al. | |
| 2018/0031836 | A1* | 2/2018 | Johnson ............. | G02B 27/0172 |
| 2018/0070817 | A1* | 3/2018 | Kalina, Jr. ............. | A61B 3/117 |
| 2018/0275405 | A1* | 9/2018 | Dobschal ................ | G02B 6/34 |

OTHER PUBLICATIONS

Karp et al.; “Planar micro-optic solar concentrator”; Optics Express; 2010; pp. 1122-1133; vol. 18, issue 2.

Xie et al.; “Total internal reflection-based planar waveguide solar concentrator with symmetric air prims as couplers”; Optics Express; 2014; pp. A1389-A1398; vol. 22, issue S6.

Mellette et al.; “Planar waveguide LED illuminator with controlled directionality and divergence”; Optics Express; 2014; pp. A742-A758; vol. 22, issue S3.

Karp et al.; “Orthogonal and secondary concentration in planar micro-optic solar collectors”; Optics Express; 2011; pp. A673-A685; vol. 19, issue S4.

Hegde Ravi S. et al.; “Periodic microstructures for improved lens-to-waveguide coupling efficiency in microlens array planar solar concentrators”; Journal of Photonics for Energy; Jun. 12, 2015; pp. 1-10; 052099; vol. 5.

Siitonen Samuli et al.; “Coupling of light from an LED into a thin light guide by diffractive gratings”; Optical Society of America, Applied Optics; Oct. 20, 2004; pp. 5631-5636; vol. 43, No. 30.

* cited by examiner

LIGHT GUIDE ARRANGEMENT FOR A MOBILE COMMUNICATIONS DEVICE FOR OPTICAL DATA TRANSMISSION, MOBILE COMMUNICATIONS DEVICE AND METHOD FOR OPTICAL DATA TRANSMISSION

CROSS-REFERENCE TO RELATED APPLICATION

This application claims priority to German Patent Application Serial No. 10 2017 209 093.6, which was filed May 31, 2017, and is incorporated herein by reference in its entirety.

TECHNICAL FIELD

Various embodiments relate to a light guide arrangement for a mobile communications device for optical data transmission by means of an optoelectronic interface component of a communications device. Moreover, various embodiments relate to a mobile communications device with such a light guide arrangement. Furthermore, various embodiments relate to a protective sleeve for a cellular telephone with such a light guide arrangement. Furthermore, various embodiments relate to a communications system with such a mobile communications device and a remote station. Finally, various embodiments relate to a method for operating an optical data link and to another method for operating an optical data link.

BACKGROUND

Various embodiments provide a light guide arrangement for a mobile communications device, a protective sleeve with a light guide arrangement for a cellular telephone, a communications system with a mobile communications device and a method, by means of which the data transmission via an optical path between a mobile communications device and a remote station is improved Wireless communication is ubiquitous and the need for mobile data links with a high speed is ever increasing. The frequency spectrum for radio-based wireless communication is developing into a rare resource. Therefore, radio-based communications technologies can be complemented or even replaced in the near future by optical wireless communication (OWC). In optical wireless communication, light is used as a medium for the data transmission. Visible light (visible light communication, VLC), infrared (IR), near infrared (NIR) or other wavelengths can be used for the transmission.

Smartglasses for presenting an augmented reality (AR) and video glasses for presenting a virtual reality (VR) are becoming ever more popular. These devices are becoming consumer products. The market is growing and a high market volume is predicted. To this end, low costs are sought after. Depending on the application, smartglasses/video glasses require an extremely high data rate, a low latency time and a bidirectional data link, for example for a videoconference in real time with a high quality. On account of the peculiarities of smartglasses or video glasses, the data link is ideally wireless. Current radio-based technologies are not yet able to provide such connectivity.

Like smartglasses/video glasses, cellular telephones, organizers and other portable devices are also becoming increasingly popular. Depending on the case of application, it may be important to provide a wireless link without producing electromagnetic interference (EMI) in the process. By way of example, this is of interest for use in hospitals, airplanes or other EMI-sensitive regions.

At the same time, the light-based transmission is insensitive to EMI. By way of example, this is of interest for use in industrial surroundings, where radio connections can be disturbed by, for instance, electric motors, strong magnetic fields and electric welding work.

Light cannot penetrate obstacles such as walls and doors, or can only penetrate these with great difficulties. This property can be exploited to provide wireless communications technology in a local and interception-proof manner. By way of example, this would be of interest for conference rooms or for installations with increased security requirements.

On account of the properties of light, a line-of-sight (LoS) link is preferable for the light-based data transmission. Shadowing, caused by the human body, for example, and mobility, caused by the head being rotated, for example, represent a technical challenge that requires a suitable solution.

Multidirectional transceiver units are required in order to maintain a line-of-sight link in virtually any desired alignment of the body or of the device. Minimizing the number of components and the extent of wiring between the components helps reduce costs.

Current optical transceiver concepts operate according to a single input single output (SISO) principle on the part of the transmitter, for example. Here, a data signal to be transmitted is converted into an analog signal by means of a modulation method and converted into an analog power signal by a driver. Said analog power signal is converted into a light signal for optical wireless communication by an optoelectronic transmission element, for example a light-emitting diode (LED) or a laser diode (LD). This light signal is emitted by way of a suitable optical unit.

Additionally, solutions that operate according to a multiple input multiple output (MIMO) principle are also known. Here, for example on the transmitter side, the data signal is reshaped into an analog signal via a common modulator, supplied to a common driver and then distributed as an analog power signal to different optoelectronic transmission elements, each with a dedicated optical unit. In a corresponding manner, a light signal transmitted by the optical wireless link is captured on the receiver side by a plurality of different optoelectronic reception elements, each with a dedicated assigned optical unit, and combined into an analog electrical signal by way of a signal combining member which, in the simplest case, carries out equal gain combining (EGC), said electrical signal then being supplied to a common demodulator via an amplifier/filter device. Moreover, the drivers on the transmitter side or the amplifiers/filters on the receiver side can be weighted individually for the individual transmission paths or branches in order thereby to obtain better properties in view of the signal quality. By way of example, the signal levels of the individual transmission paths or branches can be weighted on the receiver side according to their signal-to-noise ratio (SNR) and subsequently be combined in order thereby to attain a signal with the best possible signal quality in relation to the SNR (maximum-ratio combining, MRC).

However, these solutions require a large number of components and consequently have great complexity. Distributing analog electrical signals, which by all means can have high-frequency signal components, is afflicted by losses and susceptible to interference in the process.

SUMMARY

A light guide arrangement for a mobile communications device for optical data transmission by an optoelectronic interface component of the communications device is provided. The light guide arrangement includes a light guide body with a greatest extent in the principal light guiding direction, a first optical coupling member for coupling the optoelectronic interface component to the light guide body, a second optical coupling member with a first lens element that has a first optical axis transverse to the principal light guiding direction and with a first optical deflection element arranged along the first optical axis, and a third optical coupling member with a second lens element that has a second optical axis transverse to the principal light guiding direction and with a second optical deflection element arranged along the second optical axis. The second optical axis differs from the first optical axis.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1A:
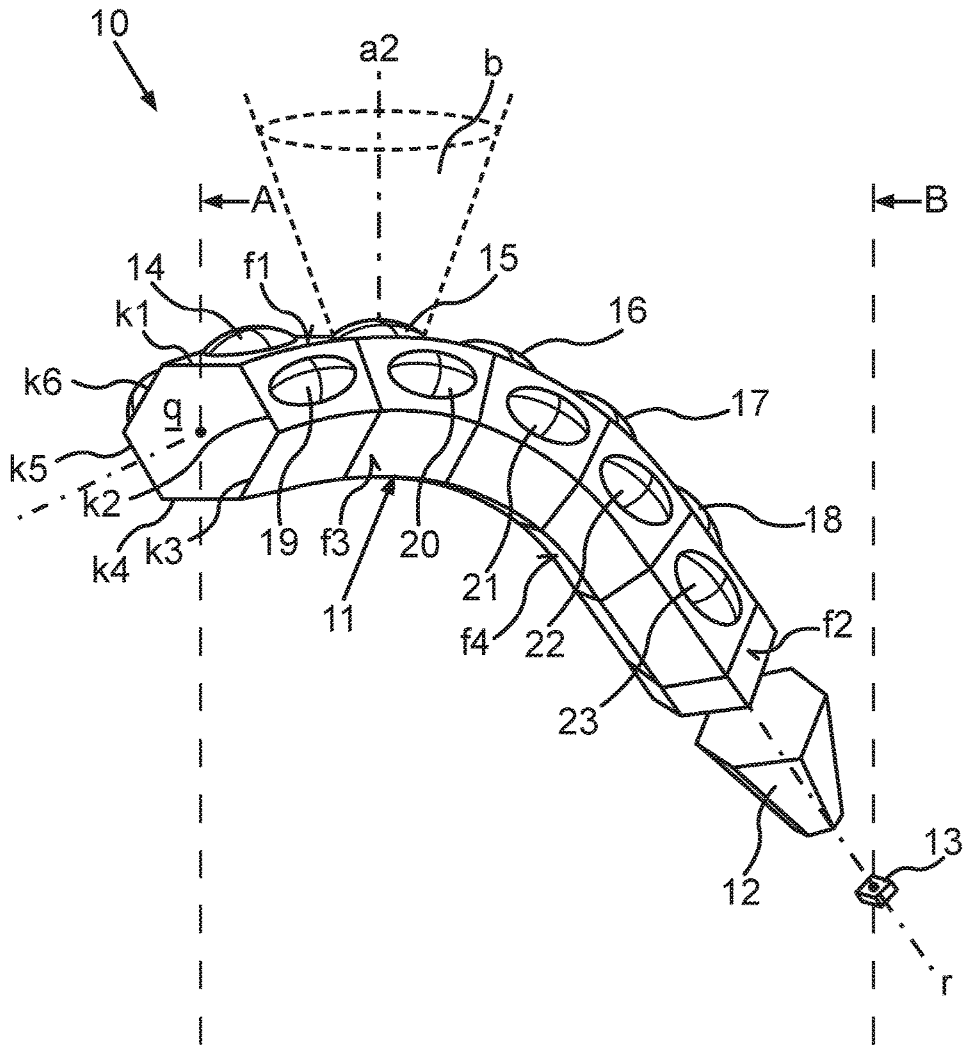
FIG. 1*a* shows a simplified schematic illustration of various embodiments of a light guide arrangement according to various embodiments in a perspective view.

The following detailed description refers to the accompanying drawings that show, by way of illustration, specific details and embodiments in which the invention may be practiced.

Various embodiments provide a light guide arrangement for a mobile communications device, a protective sleeve with a light guide arrangement for a cellular telephone, a communications system with a mobile communications device and a method, by means of which the data transmission via an optical path between a mobile communications device and a remote station is improved.

Various embodiments are based on the discovery that a multidirectional transmission/reception characteristic is required for the reliable provision of an optical data transmission for a mobile communications device, said multidirectional transmission/reception characteristic requiring a complicated and interference-proof electrical construction in the case of a high data transmission rate, indispensable in certain cases of application, and transmission/reception elements that are to be arranged in a locally distributed manner. Particularly in view of this aspect, an improvement can be obtained by virtue of there being a central provision of the electrical high-frequency analog signals at a single point in combination with a suitably embodied light guide arrangement instead of the spatial distribution of high-frequency electrical signals between transmission/reception elements that are arranged in a spatially separated manner, said improvement facilitating a simpler and interference-proof construction.

A light guide arrangement for a mobile communications device for optical data transmission by means of an optoelectronic interface component of the communications device includes a light guide body with a greatest extent in the principal light guiding direction, a first optical coupling member for coupling the optoelectronic interface component to the light guide body, and a second optical coupling member with a first lens element that has a first optical axis transverse to the principal light guiding direction and with a first optical deflection element arranged along the first optical axis.

According to various embodiments, the light guide arrangement is developed by a third optical coupling member with a second lens element that has a second optical axis transverse to the principal light guiding direction and with a second optical deflection element arranged along the second optical axis, wherein the second optical axis differs from the first optical axis.

In a different context, "Jason H. Karp, Eric J. Tremblay, Joseph E. Ford: Planar micro-optic solar concentrator, Optics Express, volume 18, issue 2, pp. 1122-1133, 2010" has disclosed a radiation concentrator, with which sunlight is input coupled in a two-dimensional lens field in a common flat planar light guide body by using locally bound apparatuses/construction features which are arranged at the focus of the respective lens in each case.

Moreover, in this respect, "Peng Xie, Huichuan Lin, Yong Liu, Baojun Li: Total internal reflection-based planar waveguide solar concentrator with symmetric air prisms as couplers, Optics Express, volume 22, issue S6, pp. A1389-A1398, 2014" exhibits an apparatus with a coupling prism formed at the light entrance side of the light guide body.

Furthermore, "William M. Mellette, Glenn M. Schuster, Joseph E. Ford: Planar waveguide LED illuminator with controlled directionality and divergence, Optics Express, volume 22, issue S3, pp. A742-A758, 2014" exhibits an illumination apparatus with an LED coupled to a planar light guide body and with output coupling apparatuses, arranged according to a periodic pattern, in the focal plane of a two-dimensional lens field or lens array matrix.

In contrast to these known arrangements, various embodiments facilitate the emission of light or the reception of light into/from very different directions, e.g. in/from directions that exceed the range of a wide-angle optical unit by far. Thus, in various embodiments, capture regions lying in the region of greater than or equal to 180 degrees are also possible. Consequently, the light guide arrangement according to various embodiments provides the basis for a multidirectional optical data transmission with a mobile communications device which is able to communicate, virtually independently of the spatial orientation thereof, with a remote station, in particular a stationary base station. Alternatively, a remote station can be realized by a further mobile communications device. In contrast to a mobile, portable device, a stationary base station should be understood to mean a communication base, usually permanently installed in a stationary manner, with a directional characteristic that is adapted to the local conditions and/or requirements.

As a result, the need for active components is minimized; i.e., only a single optoelectronic reception element or a single optoelectronic transmission element is required for the respective unidirectional operation. As a result, it is possible also, in various embodiments, to simplify the design of the electrical circuit. Here, the light guide arrangement can be configured in such a way that the optoelectronic interface component used for the optical data transmission receives a multi-directional directional characteristic. Here, the optoelectronic transmission elements need not be arranged at a common location with the optoelectronic reception elements. This allows a highly flexible design.

On account of the configuration of the light guide arrangement, there is no need to electrically connect distributed optoelectronic components over large distances. In comparison with the concepts mentioned at the outset, there is no need for extensive wiring or conductive track guidance on a printed circuit board, which would have to be designed for the transmission of high frequencies. This simplifies the circuit design and reduces electromagnetic interferences.

A mobile communications device within the meaning of various embodiments is any device that is designed at least for unidirectional data transmission by means of free-space optical communication, wherein the mobile communications device can be carried in the hand or on the body of a user when used as intended. In this context with the communications device, the terms “portable” and “mobile” are used synonymously.

The first optical coupling member for coupling the optoelectronic interface component to the light guide body can be embodied, for example, at an end face of the light guide body, for example as a lens element that focuses a beam emerging from or entering into the end face onto the optoelectronic interface component. Alternatively, the cross section of the light guide body can be adapted, e.g. tapered toward the end, in such a way that the entrance or exit cross section is matched to the correspondingly active area of the optoelectronic interface component. Alternatively, provision can be made for the optoelectronic interface component to be coupled not onto a principal light guiding direction of the light guide body but at any point of a side face of the light guide body, e.g. in the center of the light guide body, such that light coupled at this point from the optoelectronic interface component is steered toward both end faces of the light guide body in the principal light guiding direction.

Here, the principal light guiding direction is not necessarily a constant direction; instead, the principal light guiding direction can follow the form of the light guide body. Here, the principal light guiding direction should not be understood within the meaning of the actual beam path that is brought about by a multiplicity of reflections occurring individually by way of total-internal reflection at the surface of the light guide body; instead, the principal light guiding direction should be understood to be the mean propagation direction of the light within the light guide body. Consequently, the principal light guiding direction substantially follows the external contour of the light guide body.

Within the meaning of various embodiments, the first axis being displaced parallel in relation to the second axis is not sufficient for the second optical axis to differ from the first optical axis; rather, there has to be at least one angle offset that differs from zero present between the two optical axes. A possible minimum value is 5 degrees. Consequently, a light guide arrangement of the type according to various embodiments can be used to expand the solid angle range covered for the optical data transmission as desired in relation to a known light guide arrangement.

According to various embodiments, provision is made for the angle between the first optical axis and the second optical axis to be greater than a first offset angle that is 50 percent of the arithmetic mean of a first aperture angle and a second aperture angle or 50 percent of the smaller value of the two values of the first aperture angle and second aperture angle, wherein the first aperture angle is determined by the first lens element in cooperation with the first optical deflection element and wherein the second aperture angle is determined by the second lens element in cooperation with the second optical deflection element. In terms of its value, the aperture angle corresponds to an image value that characterizes the spatial region which is imaged onto the first optical deflection element by the first lens element. In the reverse direction, a light beam emanating from the optical deflection element would have said aperture angle, which the projected light beam covers in a respective plane direction, after passage through the first lens element. Consequently, the aperture angle depends substantially on the position of the optical deflection element in relation to the focal plane of the first lens element. A parallel beam path with an aperture angle of 0 degrees is obtained in the ideal case by placing the optical deflection element in the focal plane of the first lens element.

Consequently, taking account of the respective aperture angles, a segmented coverage of a predetermined spatial region for an optical data transmission can be obtained by such an angle-offset arrangement of the first optical axis in relation to the second optical axis, wherein multiple coverages can be reduced to the necessary amount. This coverage can be without gaps, i.e., completely cover a contiguous solid angle range. Alternatively, provision can be made for portions within a contiguous solid angle range to be omitted, for example by realizing a ring-shaped emission/reception characteristic.

In various embodiments, the first lens element can be embodied as a spherical lens or as a lens with a non-rotationally symmetric imaging characteristic. In the latter case, this would allow different aperture angles to occur in the respective directions, which should be taken into account in the respective direction. In terms of their optical imaging characteristics, the first lens element and the second lens element can have the same configuration; however, this is not a precondition for the applicability of various embodiments.

According to various embodiments, the angle between the first optical axis and the second, e.g. adjacent, optical axis is less than a second offset angle that is 90 percent of the arithmetic mean of a first aperture angle and a second aperture angle or 90 percent of the smaller value of the two values of the first aperture angle and second aperture angle, wherein the first aperture angle is determined by the first lens element in cooperation with the first optical deflection element and wherein the second aperture angle is determined by the second lens element in cooperation with the second optical deflection element. For a combination of the embodiments in relation to a restriction to a range between at least the first offset angle and at most the second offset angle, the underlying first and second aperture angles are naturally the same. Independently of a minimum value for the angle between the first optical axis and the second optical axis, the value of the angle between the first optical axis and the second optical axis may be, at most 100 percent, 90 percent, 80 percent, 70 percent of the second offset angle. This can reliably prevent that, in the coverage of the adjacent spatial region between the two regions covered by the first lens element in conjunction with the first optical deflection element and the second lens element in conjunction with the second optical deflection element, a gap arises between these two regions.

According to various embodiments, the light guide arrangement includes a fourth optical coupling member with a third lens element that has a third optical axis transverse to the principal light guiding direction and with a third optical deflection element arranged along the third optical axis, wherein the third optical axis differs from the first optical axis and the second optical axis.

According to various embodiments, the light guide body has the form of a bar that is curved along the principal light guiding direction and/or angled one or more times. In various embodiments, the light guide body has an arc-shaped or bracket-shaped embodiment. Here, arc-shaped should be understood to mean a continuous—but not necessarily constant—curvature of the light guide body along the principal light guiding direction. A bracket-shaped configuration of the light guide body includes straight portions of the bar-shaped light guide body along the principal light guiding direction, which are connected to one another by arc-shaped portions of the light guide body. In various embodiments, these arc-shaped portions can be quarter-circle arcs such that the portions of the light guide body connected to one another thereby form an angle of 90 degrees in relation to one another. Here, the light guide arrangement can be formed in such a way that it nestles against the mobile communications device along the direction of the principal light guiding direction, in particular forms a surface of the mobile communications device. As a result of this, it is possible, in particular, to also equip portable communications devices that, when used as intended, completely or partly engage around a body part of the wearer, for example the head or a wrist, with a light guide arrangement according to various embodiments in such a way that complete shielding or shadowing of the optical data transmission by the relevant body part is largely avoided.

According to various embodiments, the light guide body has transverse to the principal light guiding direction a profile with at least two edges that are inclined against one another. Here, the first lens element is arranged at a first surface of the light guide body that is co-determined by a first of the at least two edges and the second lens element is arranged at a second surface of the light guide body that is co-determined by a second of the at least two edges. By way of example, these two edges that are inclined against one another can be matched to an external contour of the mobile communications device in such a way that these continue the lines of the mobile communications device. Provision can likewise be made for the light guide body with a rod—shaped embodiment in its cross section to project beyond the outer face of the mobile communications device, at which the light guide arrangement is assembled, in a transverse direction to the principal light guiding direction such that it is possible to establish at these side faces that emerge in relation to the surrounding face a line-of-sight link to a remote station, in particular a stationary base station, at different angles of inclination. By way of example, in terms of its cross section, the light guide body can have a triangle-shaped configuration, wherein provision can be made for the corners of the triangle to have a wholly or partly rounded-off configuration; likewise, provision can be made of a rectangle-shaped or square cross section. In various embodiments, the light guide body can be embodied as a symmetrical trapezoid or as a rectangular trapezoid, wherein the angle between the first of the at least two edges and the second of the at least two edges preferably has a value greater than or equal to 120 degrees and less than or equal to 135 degrees.

Alternatively, the light guide body can have a circular cross section or an oval/ellipsoid cross section transverse to the principal light guiding direction.

According to various embodiments, the first optical axis is aligned along the normal to a surface portion on the side of the light guide body facing the first lens element, through which the first optical axis extends. As a result of this, light radiated into the light guide body in the principal light guiding direction is guided to the best possible extent in the light guide body by total-internal reflection and virtually perpendicular output coupling or input coupling of the light rays passing through the surface portion of the light guide body from or to the first optical deflection element is achieved. Expressed differently, light propagating along the principal light guiding direction strikes the aforementioned surface portion at a flat angle, virtually parallel in the ideal case, whereas light for input or output coupling via the deflection element passes the surface portion virtually perpendicular and consequently with few reflections.

According to various embodiments, the light guide body is produced integrally together with the first optical coupling member, e.g. by common injection molding of the light guide body and the first optical coupling member. As a result of this, the production and assembly of the light guide arrangement can be simplified.

According to various embodiments, the light guide body is produced from flexible, e.g. elastically deformable material. This is particularly expedient for e.g. applications in which the mobile communications device has headphones with two headphone earpieces that are connected to one another by way of a headband, wherein the light guide arrangement is applied to the headband. In various embodiments, this avoids an impairment of the comfort of wear. Moreover, this prevents the material of the light guide body from being damaged by the mechanical load during bending.

In various embodiments, provision can be made for the light guide body, which, for example, has a rod-shaped or bar-shaped basic form, to run out with fan-shaped branching at at least one end of the light guide body. The individual ends, which consequently form the termination at least at one side of the light guide body in the principal light guiding direction like individual fingers, can be present in a three-fingered configuration, for example, with the fingers being similar to a bird's claw in terms of their arrangement. In an embodiment with flexible material for the light guide body, such fingers can be placed around the corners of a laptop display, for example, and can be fastened there. Here, the individual fingers are each occupied by at least one pair made of a lens element and the assigned deflection element. Naturally, a division of the principal light guiding direction corresponding to the number of fingers occurs at the branching.

According to various embodiments of the light guide arrangement, the optoelectronic interface component includes an optoelectronic reception element, wherein the first optical coupling member is designed to guide light from the light guide body from the principal light guiding direction to the optoelectronic reception element. In particular, a single optoelectronic reception element can be provided for the mobile communications device, said single optoelectronic reception element being coupled to the light guide body via the first optical coupling member such that light of the optical data transmission received from different directions is converted centrally at one point into an electrical signal and forwarded from there.

According to various embodiments of the light guide arrangement, the optoelectronic interface component includes an optoelectronic transmission element, wherein the first optical coupling member is configured to guide light produced by the optoelectronic transmission element into the light guide body in the principal light guiding direction. In various embodiments, provision can be made for the optoelectronic transmission element to be the only optoelectronic transmission element applied for the optical data transmission. In various embodiments, provision can be made for the optoelectronic transmission element to be arranged in the direct vicinity of the optoelectronic reception element and to be coupled together with the latter to the light guide body via the first optical coupling member.

Consequently, the interface component can be realized in one of the following variants: the interface component is only designed for unidirectional operation and includes either only a transmission element or only a reception element, or the interface component is designed for bidirectional operation and includes both a transmission element and a reception element, wherein the interface component can have an integral or two-part configuration. In the case of a two-part configuration, the transmission element and reception element can be arranged spatially spaced apart from one another; in this case, the first optical coupling member can likewise have configurations that are spatially separated from one another.

In various embodiments, a mobile communications device for outputting images and/or sound to a user includes a light guide arrangement according to various embodiments, wherein the communications device has an optical data interface that is coupled to the light guide body by the first optical coupling member, from which a mobile communications device according to various embodiments emerges. This optical data interface can be embodied in unidirectional fashion as a transmission interface, in unidirectional fashion as a reception interface or in bidirectional fashion as a combined transceiver interface.

In various embodiments, the mobile communications device is embodied as a visual output device to be worn on the head, a cellular telephone, a mobile computer, e.g. a tablet computer, or headphones. Consequently, the effects of the variable spatial orientation of the communications device, caused by the wearer of the mobile communications device, on the quality of the optical data transmission can be significantly reduced by various embodiments. Hence, the requirements in view of a multidirectional transceiver characteristic on the one hand and the requirements of a correspondingly high data rate for the optical data transfer on the other hand, for which a correspondingly high signal quality is a precondition, are taken into account for the respective application.

According to various embodiments, the mobile communications device is designed to capture an acoustic signal from the surroundings of the communications device and to transmit an audio signal generated from the acoustic signal via the optical data interface. Such a communications device therefore can be used as a replacement or as a security-relevant redundant communication means for a conventional walkie-talkie. This is of interest, for example, where elevated radio interference levels are present on account of raw industrial or other surroundings, which could make reliable radio telephony more difficult or impossible.

Moreover, provision can be made for the mobile communications device to be designed only for transmitting sound by the optical data interface.

In addition to a pure reception variant, which only receives an audio signal via the optical data interface and outputs said audio signal to a user as an acoustic signal, for example a so-called "audio guide", it is also possible to realize pure transmission variants, which only transmit data via the optical data interface. An armband, for example equipped with fitness sensors, can establish a link to a smartphone in this case. A further possible application for this is the use in a hospital, where radio connections are considered to be critical on account of the safety prescriptions.

According to a further aspect of various embodiments, a mobile communications device is embodied to receive video data via an optical data interface, wherein the mobile communications device is embodied as a pair of video glasses, e.g. glasses for displaying a virtual reality, or smartglasses for presenting augmented reality. Here, the optical data interface facilitates the high data rates that are required for the aforementioned applications, said data rates lying far above the data rates that are currently facilitated by available WLAN (Wireless Local Area Network) technology.

According to various embodiments, a protective sleeve for a cellular telephone includes a light guide arrangement according to various embodiments. Here, this can be a removable, in particular flexible protective sleeve. Here, the first optical coupling member is designed to couple the light guide body to a camera of the cellular telephone, acting as an optoelectronic reception element, if the mobile communications device, for example a mobile telephone, is assembled in the protective sleeve as intended. Alternatively, or additionally, the first optical coupling member can be designed to couple the light guide body to a flashlight source acting as an optoelectronic transmission element, or any other optical signal source, for example the signaling LED usually used in cellular phones, if the cellular telephone is assembled in the protective sleeve as intended.

Alternatively, provision can be made for the protective sleeve to have an active interface for wireless and/or wired coupling to the mobile communications device, for example in the form of a cellular telephone. Hence, it is possible to circumvent restrictions present in view of the transmission properties of the optoelectronic reception elements (camera) or optoelectronic transmission elements (flashlight source, signaling LED) that are part of the cellular telephone. By way of example, such an active interface can be effectuated by way of a USB (Universal serial bus) link, a Bluetooth link, a near field communication (NFC) link or a WLAN (wireless local area network) link. Optionally, it is possible to provide a separate connector for an external power supply by way of a mobile power bank. By changing from a radio channel to an optical channel, it is possible, firstly, to improve the quality of the transmission in surroundings with elevated electromagnetic interference loads, and secondly advantages arise in respect of a potential interceptibility of the link as optical signals can only be evaluated in case of a line-of-sight link and hence an unauthorized interception can be practically excluded within closed spaces.

In various embodiments, a communications system includes a communications device according to various embodiments and a remote station, in particular a stationary base station, which is designed to set up an optical communications link to the mobile communications device. Naturally, the remote station can also be embodied as a mobile remote station, for example in the form of a portable computer. In various embodiments, the remote station can be realized by a second mobile communications device according to various embodiments.

Here, the stationary base station can be provided as a luminaire, e.g. as a ceiling luminaire. In various embodiments, the optical unit of the luminaire, primarily used here for illumination purposes, can also be used for the optical data transmission. Particularly preferably, the communication via the optical data link can be used by means of infrared light in the wavelength range from 780 nanometers to 1400 nanometers. Consequently, it is possible to keep visible light that is used for illumination purposes away from an optoelectronic reception element of the luminaire by way of appropriate filtering and hence to prevent interference by light produced by the luminaire itself.

Naturally, various embodiments are not limited to the application in an optical data transmission between a mobile portable communications device and a stationary base station. Rather, it is also possible for direct communication, which is effectuated directly by an optical data transmission between two mobile communications devices, to be provided.

Moreover, various embodiments proceed from a method for operating an optical data link between a mobile communications device with a light guide arrangement, which includes a light guide body with a greatest extent in the principal light guiding direction and a first optical coupling member, and a stationary base station. The method includes the processes of input coupling light produced by an optoelectronic transmission element into the light guide body in the principal light guiding direction via the first optical coupling member, output coupling light from the light guide body at a first point, from the principal light guiding direction into a direction transverse to the principal light guiding direction, and emitting the light, output coupled at the first point, along a first optical axis with a predeterminable first aperture angle.

According to various embodiments, the method is developed by output coupling light from the light guide body at a second point, from the principal light guiding direction into a direction transverse to the principal light guiding direction, and emitting the light, output coupled at the second point, along a second optical axis with a predeterminable second aperture angle, wherein the second optical axis differs from the first optical axis.

In analogous fashion to the transmission operation presented above, various embodiments are also usable in a reception operation of the mobile communications device. Here, various embodiments proceed from a method for operating an optical data link between a mobile communications device with a light guide arrangement, which includes a light guide body with a greatest extent in the principal light guiding direction and a first optical coupling member, and a stationary base station. The method includes the processes of focusing light radiated inward along a first optical axis in a predeterminable aperture angle transverse to the principal light guiding direction, input coupling the focused light at a first point of the light guide body into the light guide body in the principal light guiding direction, and output coupling the light from the principal light guiding direction in the direction of an optoelectronic reception element.

According to various embodiments, the method is developed by focusing light radiated along a second optical axis in a predeterminable aperture angle transverse to the principal light guiding direction and input coupling the focused light at a second point of the light guide body into the light guide body in the principal light guiding direction, wherein the second optical axis differs from the first optical axis.

The effects and features and also embodiments described for the light guide arrangement according to various embodiments apply—to the extent that they are applicable—to the communications device according to various embodiments, the protective sleeve according to various embodiments and the communications system according to various embodiments. Likewise, the described advantages, features and embodiments likewise apply to corresponding methods, and vice versa. Consequently, corresponding method features can be provided for apparatus features, and vice versa.

The features and feature combinations specified in the description above and the features and feature combinations specified below in the description of the figures and/or only shown in the figures can be used not only in the respectively specified combination, but also in other combinations or on their own, without departing from the scope of various embodiments. Consequently, embodiments that are not explicitly shown or explained in the figures but which can be produced and emerge from separate feature combinations of the explained embodiments should also be considered to be disclosed by various embodiments.

Figure 1B:
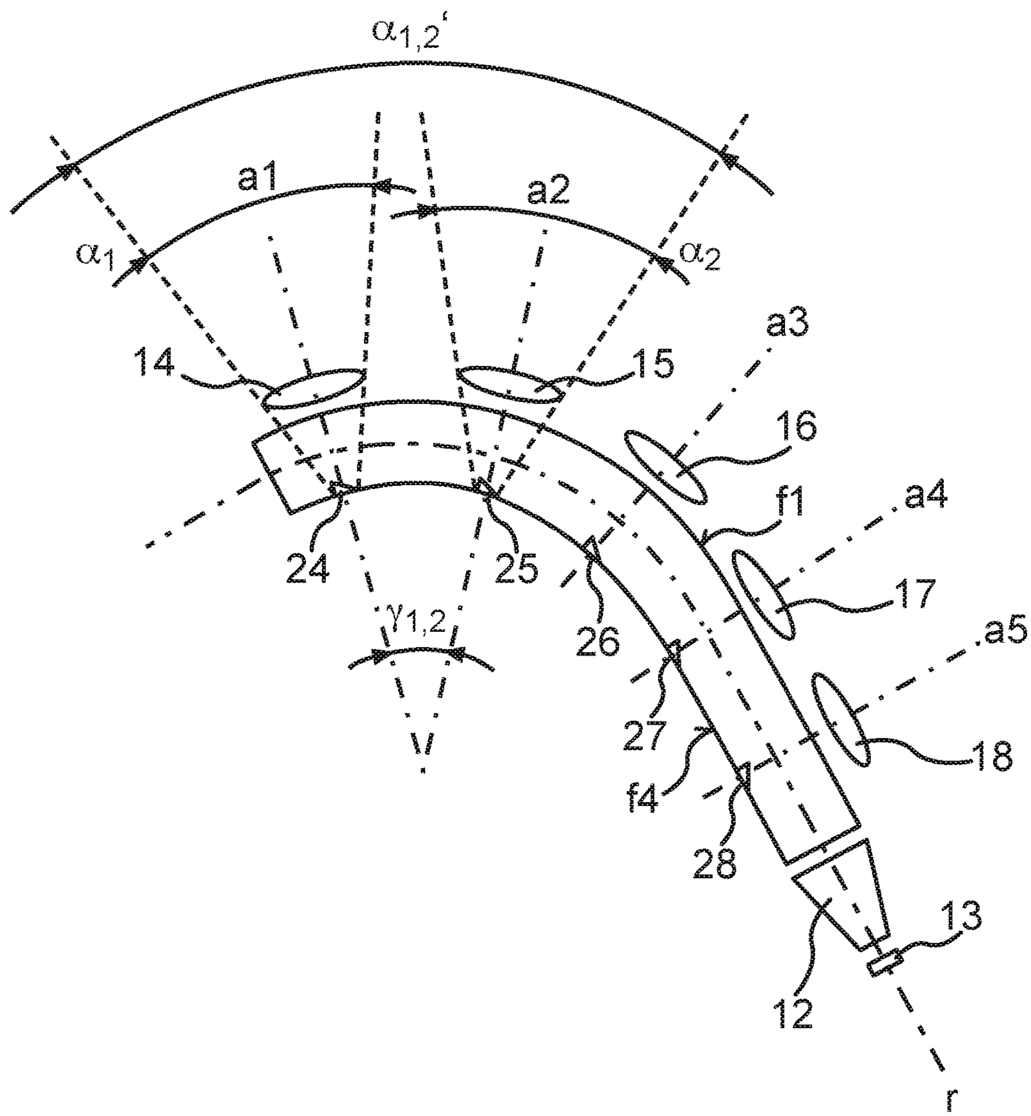
FIG. 1*b* shows a simplified schematic illustration of various embodiments according to FIG. 1*a* in a sectional image view along the plane A-B.

In accordance with the illustration in FIG. 1*a* and FIG. 1*b*, a light guide arrangement 10 according to various embodiments includes a light guide body 11 in the form of a bent rod with a hexagonal cross-sectional profile, which is imaged by way of an end face q of the light guide body 11. The hexagonal end face q is delimited by six edges, a first edge k1, a second edge k2, a third edge k3, a fourth edge k4, a fifth edge k5 and a sixth edge k6. Moreover, the perspective illustration according to FIG. 1*a* shows a first contour face f1 that is co-determined by the first edge k1, a second contour face f2 that is co-determined by the second edge k2, a third contour face f3 that is co-determined by the third edge k3 and a fourth contour face f4 that is co-determined by the fourth edge k4.

An optical coupling element 12, which serves for optical coupling of the light guide body 11 to an optoelectronic interface component 13, is arranged at the second end face of the light guide body 11 that lies opposite the end face q. In the illustrated embodiment, the coupling element 12 is embodied as a hexagonal pyramidal frustum, with the base of the pyramidal frustum and the top face of the pyramidal frustum not being included. Here, the larger base faces the light guide body 11; the smaller top face faces the optoelectronic interface component 13. A principal light guiding direction r is marked along the light guide body 11 and in the continuation by way of the coupling element 12. Alternatively, the pyramidal frustum can have a hexagonal base adapted to the light guide body 11 and a top face adapted to the form of the optoelectronic interface component 13, for example a square. Here, the transition is expediently brought about by way of a continuous transition to a circular cross-sectional area, for example half way up the pyramidal frustum. In this way, any geometries can be matched to one another.

Arranged along the first contour face f1, there are five lens elements, specifically a first lens element 14, a second lens element 15, a third lens element 16, a fourth lens element 17 and a fifth lens element 18. Arranged at the second contour face f2 adjacent to the first contour face f1, there are five further lens elements, namely a sixth lens element 19, a seventh lens element 20, an eighth lens element 21, an ninth lens element 22 and a tenth lens element 23. In the sectional illustration according to FIG. 1*b*, only the first five lens elements 14 to 18 are illustrated.

The first lens element 14 has a first optical axis a1, the second lens element 15 has a second optical axis a2, the third lens element 16 has a third optical axis a3, the fourth lens element 17 has a fourth optical axis a4, the fifth lens element 18 has a fifth optical axis a5 and the sixth lens element 19 has a sixth optical axis a6. Only the second optical axis a2 is illustrated in an exemplary manner in the perspective illustration according to FIG. 1*a*. Here, the second optical axis a2 represents the central axis of a light cone b, which can be emitted by the second lens element 15 by output coupling from the light guide body 11 or, in the reverse direction, which can be captured by the second lens element 15 for the purposes of input coupling into the light guide body 11.

Moreover, the light guide body 11, as illustrated in FIG. 1*b*, includes five optical deflection elements, which are each assigned to one of the five lens elements 14 to 18, namely a first optical deflection element 24, a second optical deflection element 25, a third optical deflection element 26, a fourth optical deflection element 27 and a fifth optical deflection element 28. The optical deflection elements assigned in a corresponding manner to the five lens elements 19 to 23, for example a sixth optical deflection element assigned to the sixth lens element 19, are not visible in FIGS. 1*a* and 1*b*. The optical deflection elements 24 to 28 are embodied as notch-shaped incisions in a fourth contour face of the light guide body 11, which lies opposite the first contour face f1. In relation to the fourth contour face, the angle of this notch is preferably 45 degrees when the fourth contour face extends virtually parallel to the first contour face f1 in the principal light guiding direction r, as illustrated in FIGS. 1*a* and 1*b*. While the parallel property of the first contour face f1 and the fourth contour face f4 can be identified without doubt in the region of the fifth optical axis a5, use of the term concentric instead of parallel lends itself in the special case of a circular curvature of the light guide body 11, like in the region of the second optical axis a2, for example. Here, the common circle center would be seen to be at the point of intersection of the first optical axis a1 and the second optical axis a2. Here, the principal light guiding direction r follows the contour of the light guide body 11; the explanations in respect of "parallel" and "concentric" apply analogously here. Consequently, light is reflected along the principal light guiding direction r by way of total-internal reflection at the interface between the light guide body 11 and the surroundings outside of the light guide body 11 such that said light passes through the first contour face f1 substantially at an angle of 90 degrees, i.e. perpendicular, in relation to the first contour face f1.

Reference is made here to the fact that not only the first lens element 14 and the second lens element 15 with the associated second optical axis a2 and the assigned second optical deflection element 24, but likewise any pairs from the embodiment, can be considered to be the first lens element and the second lens element according to the phrasing of the patent claims. Consequently, the sixth lens element 19, for example, can be considered to be the second lens element according to the phrasing of the patent claims; however, the optical axis thereof and the associated deflection element are not illustrated in FIG. 1*a* and FIG. 1*b* for reasons of an improved overview.

The same applies to light through the respective lens element that is incident along a respective optical axis. The passage of the inwardly radiated or emitted light through the first contour face f1 is consequently effectuated substantially perpendicular, i.e. in the normal direction, to the first contour face f1. According to various embodiments, the normal direction of the first contour face f1, which changes along the principal light guiding direction r, is parallel in each case to the relevant respective optical axis at the points where the optical axes a1 to a5 pass through. Expressed differently, the respective optical axis a1 to a5 passes through the first contour face f1 in orthogonal fashion and hence represents the direction of the normal vector at the relevant surface element.

In conjunction with the first optical deflection element 24, the first lens element 14 forms an emission or capture cone having a first aperture angle $\alpha_1$. In a corresponding manner, the second lens element 15 forms the light cone b (FIG. 1*a*) in conjunction with the second optical deflection element 25 as an emission or capture cone with a second aperture angle $\alpha_2$. Here, according to various embodiments, the respective emission or capture cones have a rotationally symmetric embodiment. However, depending on the configuration of the respective lens elements and the optical deflection elements, it is possible to realize deviating cone forms, for example with a characteristic that is oval or that approximates to a rectangular form.

A first axis difference angle $\gamma_{1,2}$ is provided between the first optical axis a1 and the second optical axis a2, said axis difference angle specifying the angle by which the second optical axis a2 is tilted in relation to the first optical axis a1. Here, the condition for an overlap of the two emission or capture cones is:

$$\gamma_{1,2} < \frac{\alpha_1 + \alpha_2}{2}.$$

That is to say, the first axis difference angle $\gamma_{1,2}$ must be smaller than the (arithmetic) mean of the first aperture angle $\alpha_1$ and the second aperture angle $\alpha_2$.

Consequently, in the sectional image plane according to the illustration of FIG. 1*b*, an effective aperture angle $\alpha'_{1,2}$ emerges for the interaction of the first lens element 14 with the second lens element 15, with the following applying:

$$\alpha'_{1,2} = \gamma_{1,2} + \frac{\alpha_1 + \alpha_2}{2}.$$

The effective aperture angle $\alpha'_{1,2}$ derived in the example of the two optical coupling members, including the first lens element 14 with the first optical axis a1 and the first optical deflection element 24 and the second lens element 15 (alternatively use could just as easily be made of the sixth lens element 19 as—e.g. adjacent—lens element, for example) with the second optical axis a2 and the second optical deflection element 25, can be extended or generalized as desired by way of the inclusion of further optical coupling members. By way of example, if the chain of coupling members with the optical axes a1, a2 and a3, as arranged on the first contour face f1, is considered and if the additional assumption is made that both the first axis difference angle $\gamma_{1,2}$ and a second axis difference angle (corresponding to $\gamma_{2,3}$), which is not illustrated in FIG. 1*b*, satisfy the aforementioned condition, i.e. $\gamma_{1,2}<(\alpha_1+\alpha_2)/2$ and $\gamma_{2,3}<(\alpha_2+\alpha_3)/2$, then the emission or capture cones of the coupling members with the optical axes a1 and a2 and the cones with the optical axes a2 and a3 overlap in pairwise fashion. Then, the following applies to the effective aperture angle of the three coupling members together: $\alpha'_{1,3}=\gamma_{1,3}+(\alpha_1+\alpha_3)/2$. If the chain is extended by the coupling member with the optical axis a4 and, additionally, by the coupling member with the optical axis a5, then the presentation made above applies in a correspondingly extended manner. In the case where the axis difference angles $\gamma_{3,4}$ and $\gamma_{4,5}$ each meet the aforementioned condition, the following applies to the effective aperture angle of the optical coupling members together: $\alpha'_{1,5}=\gamma_{1,5}+(\alpha_1+\alpha_5)/2$. The aperture angles $\alpha_3$, $\alpha_4$, $\alpha_5$ not illustrated in the figures and the axis difference angles $\gamma_{2,3}$, $\gamma_{3,4}$, $\gamma_{4,5}$ that are not illustrated here emerge in the process in a simple manner by continuing the employed labeling scheme. The same applies to the effective aperture angles $\alpha'_{1,3}$, $\alpha'_{1,4}$, $\alpha'_{1,5}$ not illustrated here.

The explanations made above in respect of an "axial" effective aperture angle apply analogously to a "tangential" effective aperture angle, which, for example, is provided by three optical coupling members including the sixth lens element 19, the first lens element 14 and the lens element without reference sign, which is arranged in the direct vicinity of the sixth edge k6 on a sixth contour face (without reference sign) that lies opposite the third contour face f3.

Figure 2:
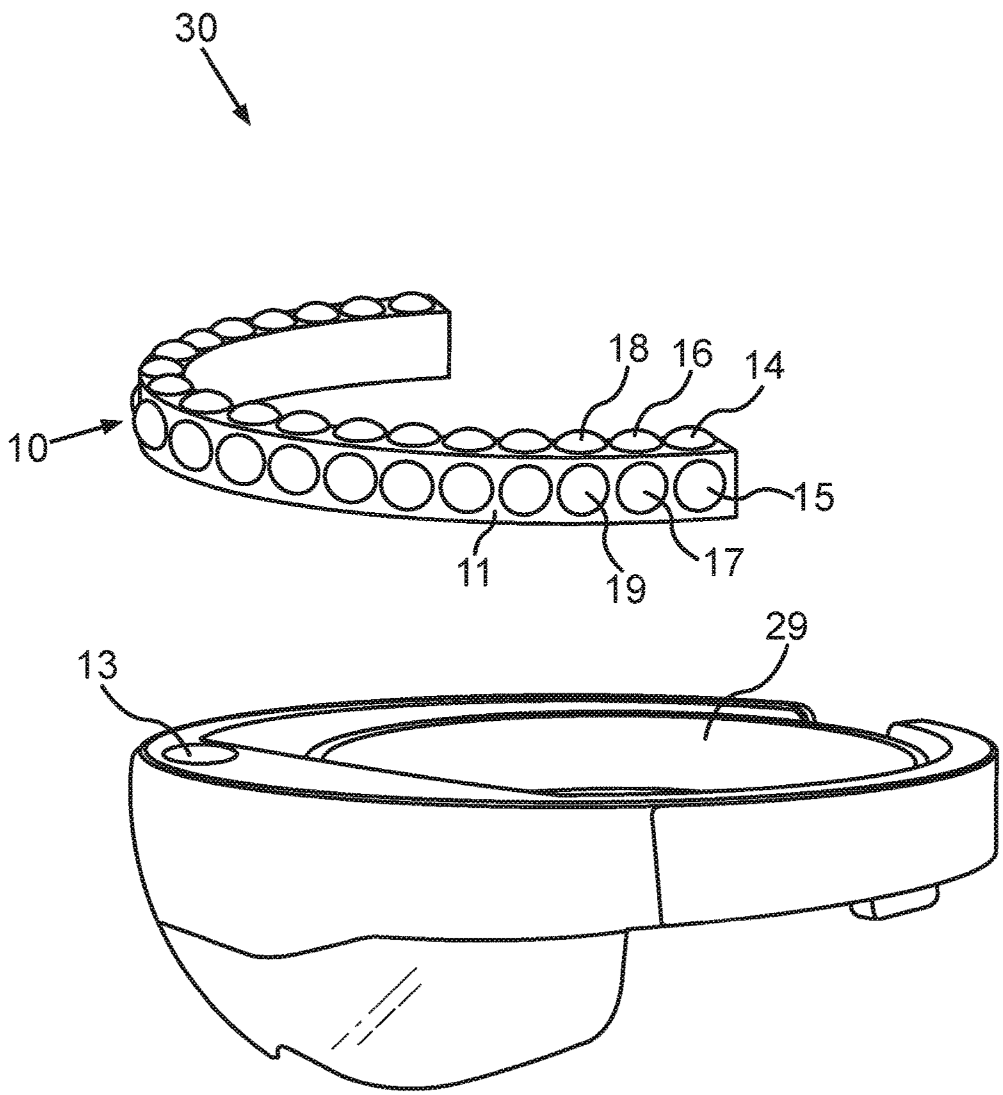
FIG. 2 shows a simplified schematic illustration of various embodiments of a mobile communications device according to various embodiments.
Figure 3:
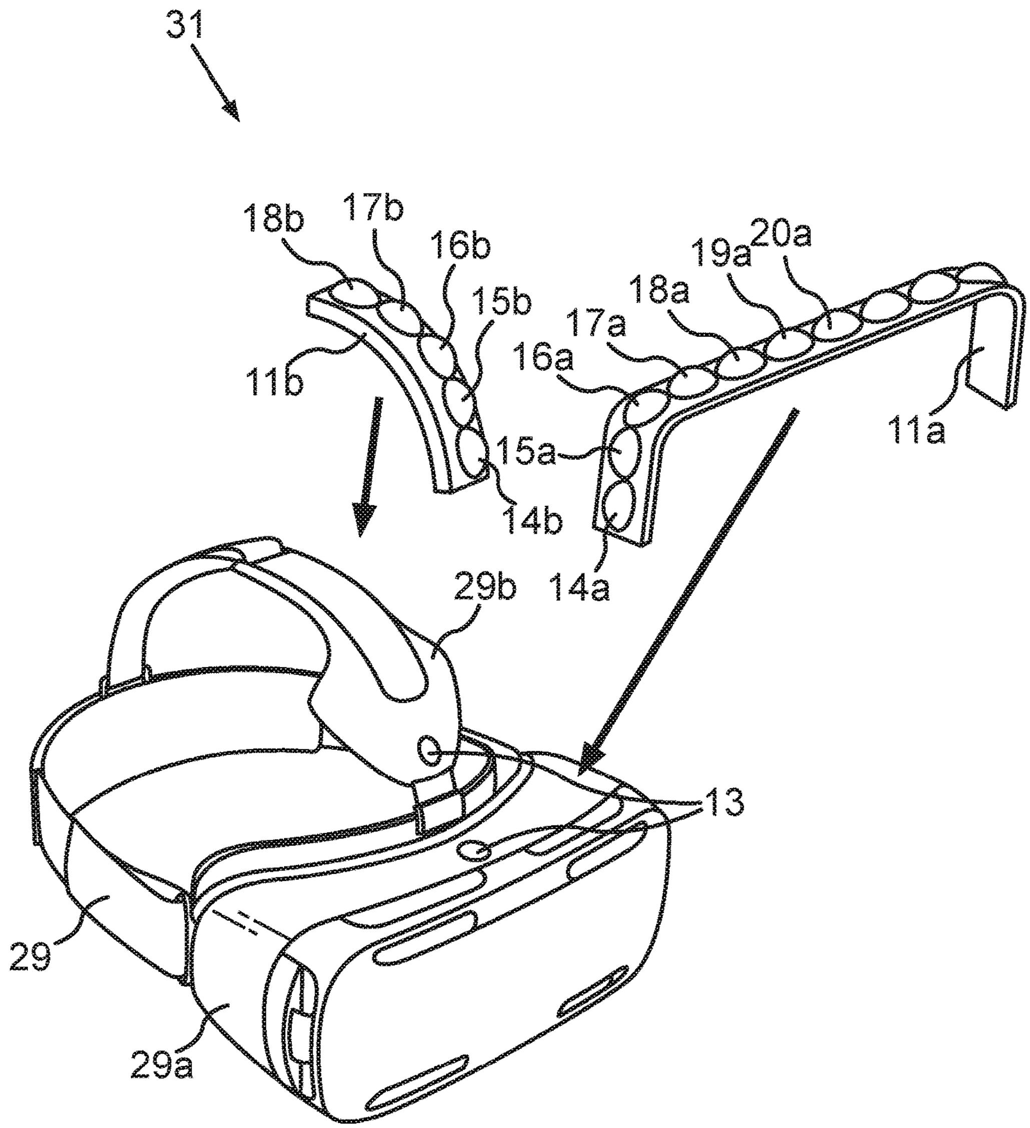
FIG. 3 shows a simplified schematic illustration of various embodiments of a mobile communications device according various embodiments.

FIG. 2 shows various embodiments of a mobile communications device according to various embodiments in the form of smartglasses 30, so called AR (augmented reality) glasses. Here, additional data is projected into the visual field of the user. What is important here is a reception without interference, which is largely independent of the head position of the user, of the data to be displayed. To this end, the optoelectronic interface component 13 is arranged at the upper side of the smartglasses 30. The light guide body 11, which is embodied as an arc-shaped light guide body 11*b* here, is assembled at this position. The arc-shaped light guide body 11*b* therefore extends beyond a housing of the smartglasses 30 into the region of a holding ring 29. The first lens element 14, the third lens element 16 and the fifth lens element 18 are arranged on the upper side of the arc-shaped light guide body 11*b*; the second lens element 15, the fourth lens element 17 and the sixth lens element 19 are arranged at the arced side face of the arc-shaped light guide body 11*b*. Further lens elements along the circumference of the arc-shaped light guide body 11*b* are indicated in FIG. 2. This consequently renders it possible to realize a multi-directional wireless optical link with a wide capture range.

Various embodiments are illustrated using the example of video glasses 31 (VR, virtual reality, glasses). The video glasses 31 include a housing 29*a*, a holding ring 29 and a headband 29*b*. Respectively one optoelectronic interface component 13 is arranged at the housing 29*a* and the headband 29*b*. A bracket-shaped light guide body 11*a* is assembled on the housing 29*a*, lens elements 14*a*, 15*a*, 16*a*, 17*a*, 18*a*, 19*a*, 20*a* being arranged at said light guide body. Moreover, an arc-shaped light guide body 11*b*, at which lens elements 14*b*, 15*b*, 16*b*, 17*b*, 18*b* are arranged, is assembled at the headband 29*b*. In contrast to the arrangement illustrated in FIG. 1*a* and FIG. 1*b*, the light from the optoelectronic interface component 13 or into the optoelectronic interface component 13 from and to the bracket-shaped light guide body 11*a* is coupled not on one side but centrally. Corresponding configurations of a suitable coupling element 12, which is integrated in the light guide body 11*a*, are known as such, for example from "Jason H. Karp, Eric J. Tremblay, Justin M. Hallas, Joseph E. Ford: Orthogonal and secondary concentration in planar micro-optic solar collectors, Optics Express volume 19, issue S4, pp. A673-A685 (2011)", "Hegde R S, Chu H, Ong K, Bera L, Png C: Periodic microstructures for improved lens-to-waveguide coupling efficiency in microlens array planar solar 5 concentrators. J. Photon. Energy. 0001; 5(1):052099" and "Samuli Siitonen, Pasi Laakkonen, Pasi Vahimaa, Konstantins 15 Jefimovs, Markku Kuittinen, Marko Parikka, Kari Monkkonen, Ahti Orpana: Coupling of light from an LED into a thin light guide by diffractive gratings, Appl. Opt. 43, 5631-5636 (2004)".

Figure 4:
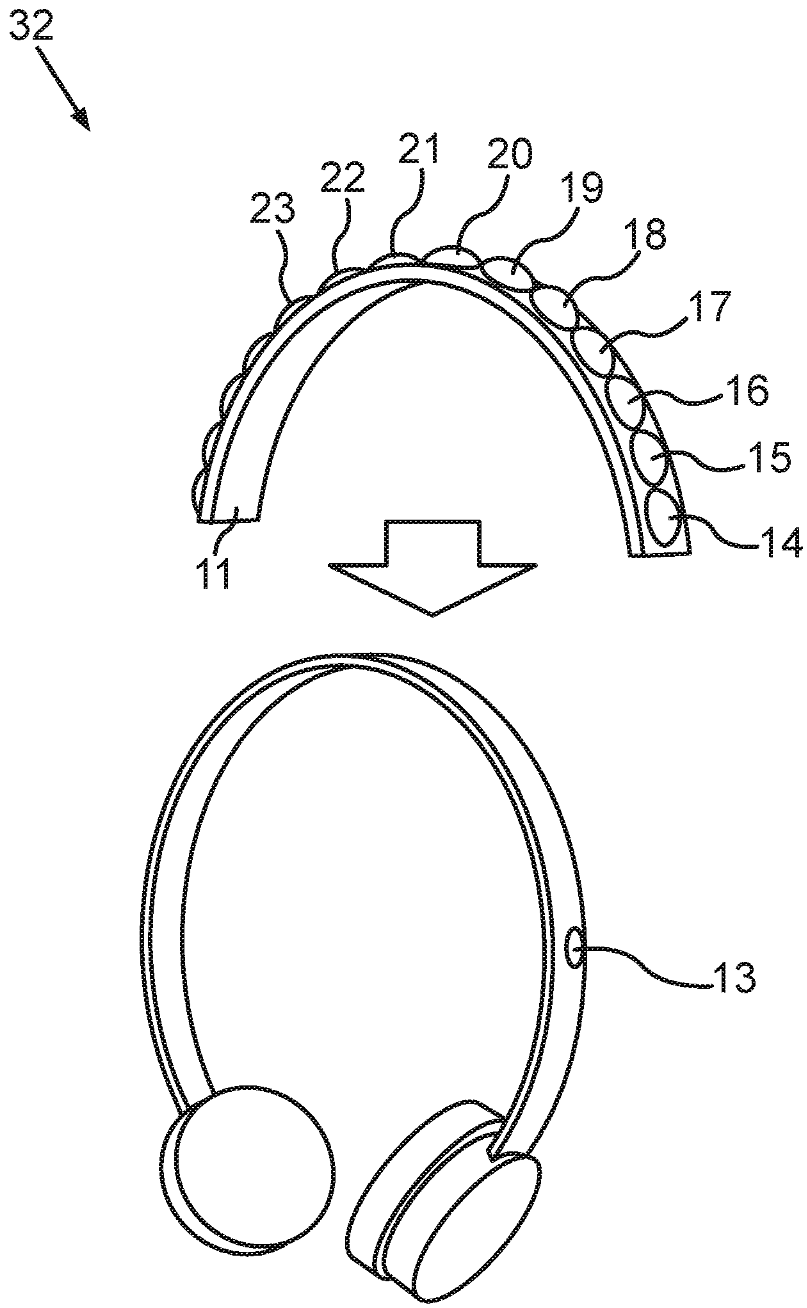
FIG. 4 shows a simplified schematic illustration of various embodiments of a mobile communications device according various embodiments.

Headphones 32 are illustrated in FIG. 4 as various embodiments of a mobile communications device according to various embodiments. On their headband, the headphones 32 have an optoelectronic interface component 13, which is designed for coupling to the light guide body 11. As already described before, the light guide body 11 includes lens elements 14 to 23, which are arranged on the outer side of the light guide body 11. The light guide body 11 is produced from flexible plastic in order to withstand the mechanical load when bending the headphones headband.

Figure 5:
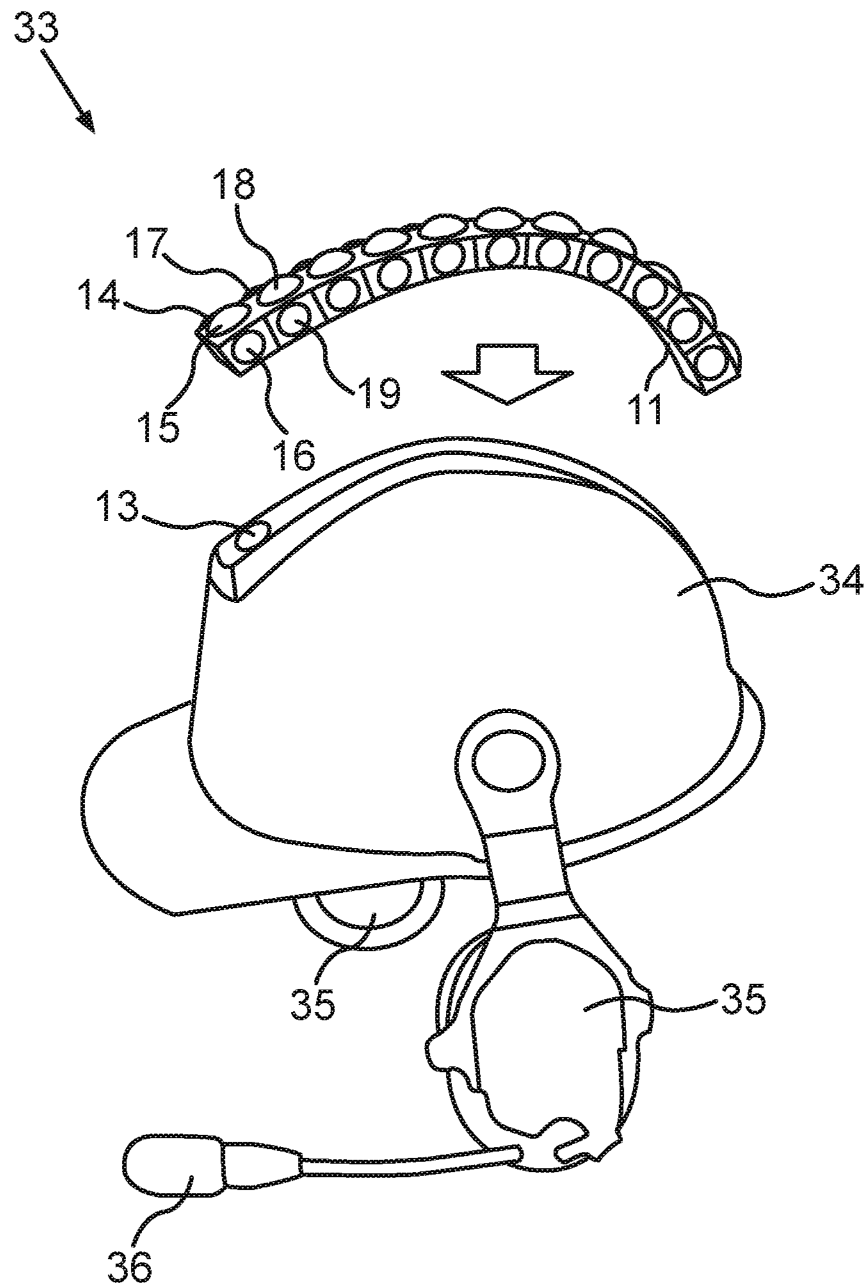
FIG. 5 shows a simplified schematic illustration of various embodiments of a mobile communications device according to various embodiments.

According to various embodiments of a mobile communications device, FIG. 5 illustrates a headphones-microphone combination 33 (headset), in which the headphones 35 are assembled on a hard hat 34. Moreover, the headphones-microphone combination 33 includes a microphone 36, which is attached to the left headphone side. The optoelectronic interface component 13, by means of which the light guide body 11 is coupled, is arranged at the hard hat 34. As has already been depicted, the light guide body 11 here includes lens elements 14, 15, 16, 17, 18, 19 and further lens elements that have not been provided with a reference sign, with three contour faces of the light guide body 11 being occupied by lens elements in various embodiments. Here, the bend of the light guide body 11 is matched to the outer contour of the hard hat 34.

Figure 6:
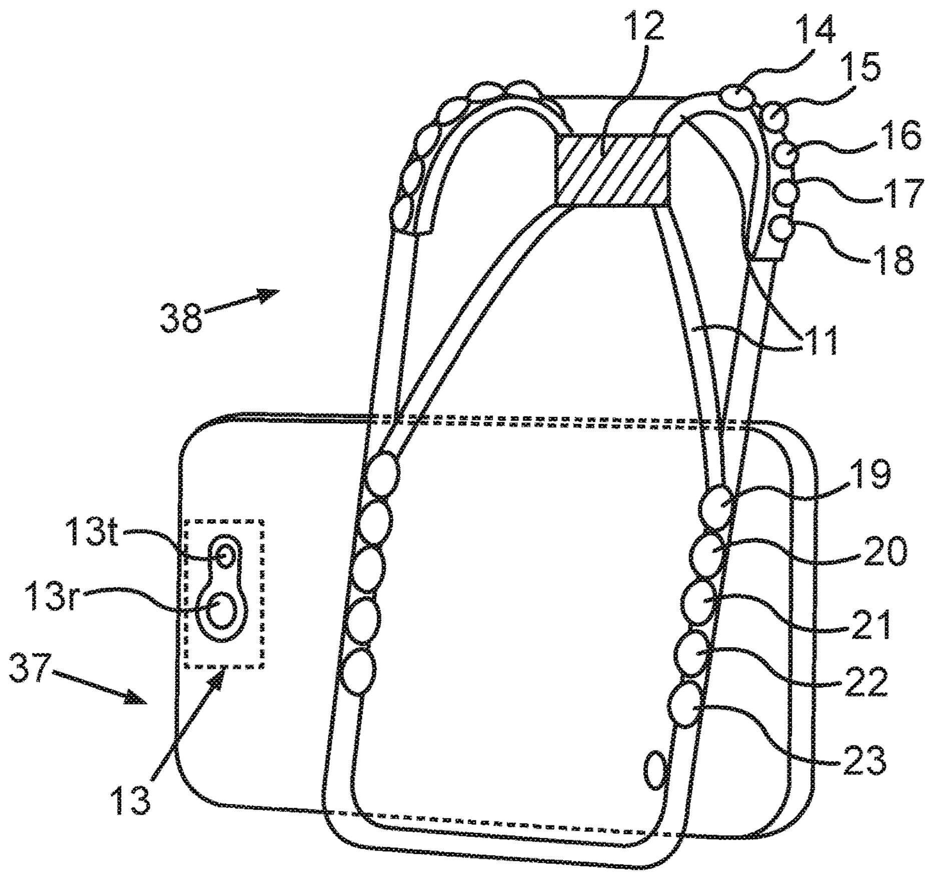
FIG. 6 shows a simplified schematic illustration of various embodiments of a protective sleeve according to various embodiments for a cellular telephone.
Figure 7:
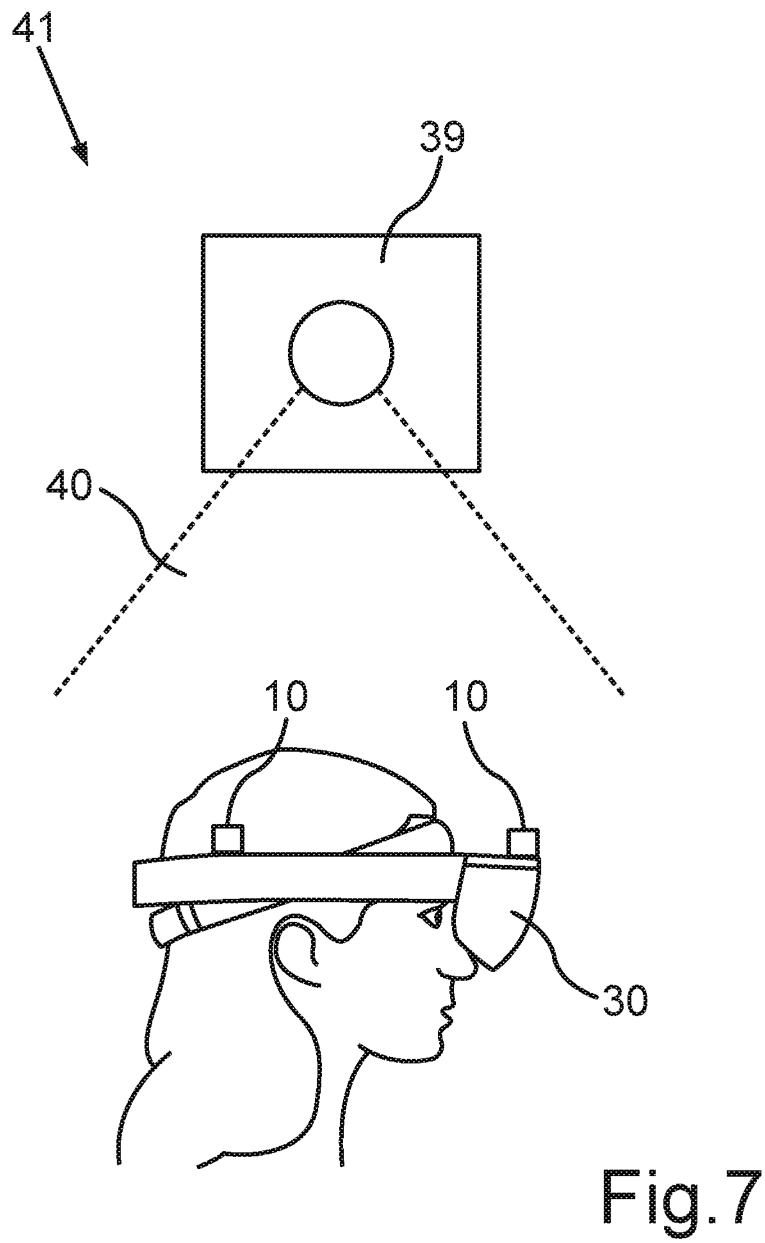
FIG. 7 shows a simplified schematic illustration of various embodiments of a communications system according to various embodiments.

According to the illustration in FIG. 6, a protective sleeve 38 according to various embodiments for a cellular telephone 37 includes a light guide body 11, on which lens elements 14, 15, 16, 17, 18, 19, 20, 21, 22, 23 are arranged. The coupling element 12 is arranged in such a way in this case that, when used as intended, it is optically coupled to the cellular telephone 37 with an optoelectronic reception element 13*r* and an optoelectronic transmission element 13*t*. Here, the camera of the cellular telephone 37 attached to the rear side finds use as optoelectronic reception element 13*r*; an LED attached to the rear side of the cellular telephone 37 serves as an optoelectronic transmission element 13*t*.

According to various embodiments, a communications system 41 according to various embodiments includes smartglasses 30 with a light guide arrangement 10, as already described above on the basis of various embodiments illustrated in FIG. 2. The communications system 41 furthermore includes a base station 39, which provides a communications range 40. Here, the base station 39 can be integrated in an existing illumination device.

As an alternative, the communications system 41 may include a second mobile communications device in place of a stationary base station 39, said second mobile communications device being designed to establish an optical communications link with the smartglasses 30.

In various embodiments, each of the communications devices presented above can be combined, both amongst themselves and with a further mobile communications device designed for an optical data transmission, to form a communications system according to various embodiments.

The embodiments only serve to explain various embodiments and do not restrict the latter. In various embodiments, the specific design of the lens elements and the deflection elements can be designed as desired without departing from the concept of various embodiments.

Thus, how a multi-directional transceiver for optical wireless communication (OWC) can be set up using a light guide body in order to fulfill the application-specific problems in respect of the provision of an at least unidirectional data link with high reliability and availability (which, indirectly, naturally also has positive effects on the data rates obtained and the resultant latency times) was shown above.

LIST OF REFERENCE SIGNS

10 Light guide arrangement
11 Light guide body
11*a* Bracket-shaped light guide body
11*b* Arc-shaped light guide body
12 Coupling element
13 Optoelectronic interface component
13*r* Optoelectronic reception element
13*t* Optoelectronic transmission element
14, 14*a*, 14*b* First lens element
15, 15*a*, 15*b* Second lens element
16, 16*a*, 16*b* Third lens element
17, 17*a*, 17*b* Fourth lens element
18, 18*a*, 18*b* Fifth lens element
19, 19*a* Sixth lens element
20, 20*a* Seventh lens element
21 Eighth lens element
22 Ninth lens element
23 Tenth lens element
24 First optical deflection element
25 Second optical deflection element
26 Third optical deflection element
27 Fourth optical deflection element
28 Fifth optical deflection element
29 Holding ring
29*a* Housing
29*b* Headband
30 Smartglasses
31 Video glasses
32 Headphones
33 Headphones-microphone combination (headset)
34 Hard hat
35 Headphones
36 Microphone
37 Cellular telephone
38 Protective sleeve
39 Base station
40 Communications range
41 Communications system
a1 First optical axis
a2 Second optical axis
a3 Third optical axis
a4 Fourth optical axis
a5 Fifth optical axis
$\alpha_1$ First aperture angle
$\alpha_2$ Second aperture angle
$\alpha_{1,2}'$ Effective aperture angle
b Light cone
f1 First contour face
f2 Second contour face
f3 Third contour face
f4 Fourth contour face
$\gamma_{1,2}$ First axis difference angle
k1 First edge
k2 Second edge
k3 Third edge
k4 Fourth edge
k5 Fifth edge
k6 Sixth edge
q End face
r Principal light guiding direction While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A light guide arrangement for a mobile communications device for optical data transmission by an optoelectronic interface component of the communications device, the light guide arrangement comprising:

a light guide body with a greatest extent in the principal light guiding direction;

a first optical coupling member for coupling the optoelectronic interface component to the light guide body;

a second optical coupling member with a first lens element that has a first optical axis transverse to the principal light guiding direction and with a first optical deflection element arranged along the first optical axis; and a third optical coupling member with a second lens element that has a second optical axis transverse to the principal light guiding direction and with a second optical deflection element arranged along the second optical axis;

wherein the second optical axis differs from the first optical axis.

2. The light guide arrangement of claim 1, wherein the angle between the first optical axis and the second optical axis is greater than a first offset angle that is 50 percent of the arithmetic mean of a first aperture angle and a second aperture angle or 50 percent of the smaller value of the two values of the first aperture angle and second aperture angle;

wherein the first aperture angle is determined by the first lens element in cooperation with the first optical deflection element; and wherein the second aperture angle is determined by the second lens element in cooperation with the second optical deflection element.

3. The light guide arrangement of claim 1, wherein the angle between the first optical axis and the second optical axis is less than a second offset angle that is 90 percent of the arithmetic mean of a first aperture angle and a second aperture angle or 90 percent of the smaller value of the two values of the first aperture angle and second aperture angle;

wherein the first aperture angle is determined by the first lens element in cooperation with the first optical deflection element; and wherein the second aperture angle is determined by the second lens element in cooperation with the second optical deflection element.

4. The light guide arrangement of claim 1, wherein a fourth optical coupling member with a third lens element that has a third optical axis transverse to the principal light guiding direction and with a third optical deflection element arranged along the third optical axis;

wherein the third optical axis differs from the first optical axis and the second optical axis.

5. The light guide arrangement of claim 1,
wherein the light guide body has the form of a bar that is at least one of curved along the principal light guiding direction or angled one or more times.

6. The light guide arrangement of claim 1,
wherein the light guide body has transverse to the principal light guiding direction a profile with at least two edges that are inclined against one another;
wherein the first lens element is arranged at a first surface of the light guide body that is co-determined by a first edge of the at least two edges; and
wherein the second lens element is arranged at a second surface of the light guide body that is co-determined by a second edge of the at least two edges.

7. The light guide arrangement of claim 1,
wherein the first optical axis is aligned along the normal to a surface portion on the side of the light guide body facing the first lens element.

8. The light guide arrangement of claim 1,
wherein the light guide body is produced integrally together with the first optical coupling member.

9. The light guide arrangement of claim 8,
wherein the light guide body is produced integrally together with the first optical coupling member by common injection molding of the light guide body and the first optical coupling member.

10. The light guide arrangement of claim 1,
wherein the light guide body is produced from flexible material.

11. The light guide arrangement of claim 10,
wherein the light guide body is produced from flexible, elastically deformable material.

12. The light guide arrangement of claim 1,
wherein the optoelectronic interface component comprises an optoelectronic reception element;
wherein the first optical coupling member is designed to guide light from the light guide body from the principal light guiding direction to the optoelectronic reception element.

13. The light guide arrangement of claim 1,
wherein the optoelectronic interface component comprises an optoelectronic transmission element;
wherein the first optical coupling member is configured to guide light produced by the optoelectronic transmission element into the light guide body in the principal light guiding direction.

14. A mobile communications device for outputting at least one of images or sound to a user, the mobile communications device comprising:
a light guide arrangement, comprising:
a light guide body with a greatest extent in the principal light guiding direction;
a first optical coupling member for coupling the optoelectronic interface component to the light guide body;
a second optical coupling member with a first lens element that has a first optical axis transverse to the principal light guiding direction and with a first optical deflection element arranged along the first optical axis; and
a third optical coupling member with a second lens element that has a second optical axis transverse to the principal light guiding direction and with a second optical deflection element arranged along the second optical axis;
wherein the second optical axis differs from the first optical axis;
wherein the communications device has an optical data interface that is coupled to the light guide body by the first optical coupling member.

15. The mobile communications device of claim 14,
wherein the mobile communications device is embodied as a device selected from a group consisting of:
a visual output device to be worn on the head;
a cellular telephone;
a mobile computer; and
a headphone.

16. The mobile communications device of claim 14,
wherein the mobile communications device is designed to capture an acoustic signal from the surroundings of the communications device and to transmit an audio signal generated from the acoustic signal via the optical data interface.

17. The mobile communications device of claim 14,
wherein the mobile communications device is embodied as a pair of video glasses or smartglasses for presenting augmented reality.

18. A protective sleeve for a cellular telephone, comprising:
a light guide arrangement, comprising:
a light guide body with a greatest extent in the principal light guiding direction;
a first optical coupling member for coupling the optoelectronic interface component to the light guide body;
a second optical coupling member with a first lens element that has a first optical axis transverse to the principal light guiding direction and with a first optical deflection element arranged along the first optical axis; and
a third optical coupling member with a second lens element that has a second optical axis transverse to the principal light guiding direction and with a second optical deflection element arranged along the second optical axis;
wherein the second optical axis differs from the first optical axis.

19. A communications system, comprising:
a mobile communications device, comprising:
a light guide arrangement, comprising:
a light guide body with a greatest extent in the principal light guiding direction;
a first optical coupling member for coupling the optoelectronic interface component to the light guide body;
a second optical coupling member with a first lens element that has a first optical axis transverse to the principal light guiding direction and with a first optical deflection element arranged along the first optical axis; and
a third optical coupling member with a second lens element that has a second optical axis transverse to the principal light guiding direction and with a second optical deflection element arranged along the second optical axis;
wherein the second optical axis differs from the first optical axis;
wherein the communications device has an optical data interface that is coupled to the light guide body by the first optical coupling member; and
a remote station, which is designed to set up an optical communications link to the mobile communications device.

20. The communications system of claim 19,
wherein the remote station is a stationary base station.

* * * * *